(12) United States Patent
Murakami et al.

(10) Patent No.: US 7,316,165 B2
(45) Date of Patent: Jan. 8, 2008

(54) FORCE DETECTION DEVICE

(75) Inventors: Seiji Murakami, Moriguchi (JP); Naoto Tojo, Moriguchi (JP)

(73) Assignee: Sanyo Electric Co., Ltd., Osaka (JP)

( * ) Notice: Subject to any disclaimer, the term of this patent is extended or adjusted under 35 U.S.C. 154(b) by 113 days.

(21) Appl. No.: 11/411,104

(22) Filed: Apr. 26, 2006

(65) Prior Publication Data

US 2006/0243058 A1   Nov. 2, 2006

(30) Foreign Application Priority Data

Apr. 28, 2005   (JP) .............................. 2005-132458

(51) Int. Cl.
    *G01N 3/08*   (2006.01)
(52) U.S. Cl. ............................................. 73/818; 414/4
(58) Field of Classification Search .......... 73/760–856; 414/4, 744–816
    See application file for complete search history.

(56) References Cited

U.S. PATENT DOCUMENTS

| | | | | |
|---|---|---|---|---|
| 3,713,501 A | * | 1/1973 | Hurt | ........................ 180/9.22 |
| 3,901,396 A | * | 8/1975 | Rhodes | ........................ 414/812 |
| 3,907,138 A | * | 9/1975 | Rhodes | ........................ 414/448 |
| 4,752,173 A | * | 6/1988 | Fleming | ....................... 414/10 |

FOREIGN PATENT DOCUMENTS

JP          9-202235          8/1997

* cited by examiner

*Primary Examiner*—Max Noori
(74) *Attorney, Agent, or Firm*—Westerman, Hattori, Daniels & Adrian, LLP.

(57) ABSTRACT

A force detection device of the present invention is for detecting an operation force of an operator applied in a uniaxial direction, and includes a force receiving part for receiving the operation force, a force detection part placed on a support for detecting the uniaxial force, a force propagation body disposed reciprocatably along the uniaxial direction on the support for propagating the operation force received by the force receiving part to the force detection part, a guide provided on the support for guiding reciprocation of the force propagation body, a preload receiving part pivoted to the force propagation body and capable of swinging within a plane along the uniaxial direction, and a pair of coil springs coupled to both sides of the preload receiving part with a pivot axis thereof held therebetween for giving a preload to the force detection part.

4 Claims, 6 Drawing Sheets

FORCE DETECTION DEVICE

The priority application Number 2005-132458 upon which this patent application is based is hereby incorporated by reference.

BACKGROUND OF THE INVENTION

1. Field of the Invention

The present invention relates to a force detection device for detecting an operation force of an operator applied in a uniaxial direction.

2. Description of Related Art

There has been conventionally proposed a truck having a power assist function for assisting human power with motive power. FIG. 10 shows a conventional power-assisted truck 8. The power-assisted truck 8 has a holding part 84 provided with a handle 80 to be given an operation force by an operator. A pair of force detection devices 9, 9 are disposed at both ends of the handle 80 (see JP 9-202235 A, for example).

The holding part 84 is supported on a base holding part 85 via four posts 83-83. Disposed on the base holding part 85 are two motors 82, 82, drive control devices 86 for controlling rotation of the motors 82, and batteries 87 for supplying power to the motors 82. Both motors 82, 82 are coupled to a pair of wheels 81, 81.

FIG. 11 shows a force detection device 9. A hinge 94 is placed on an upper portion of the post 83. The handle 80 is coupled to the hinge 94 at a base end thereof. A load cell 93 including a pressure sensor is disposed above the hinge 94. The load cell 93 has one end thereof attached to the handle 80, and the other end attached to the post 83.

A handle locking part 90 projects from the post 83 above the load cell 93. The handle locking part 90 is provided with a handle locking hole 91 in the form of a long hole. The handle 80 penetrates the handle locking hole 91. A spring 92 is stretched between the handle 80 and the post 83 above the handle locking part 90. The spring 92 applies a preload to the load cell 93.

When an operator applies an operation force to the handle 80, the handle 80 swings on the hinge 94. When the operation force is loosened, the handle 80 returns to a position right above the hinge 94 due to an elastic repulsive force of the spring 92. The operation force applied to the handle 80 by the operator can be found from a difference between a detected value of each load cell 93 and the preload. The drive control devices 86 are controlled depending on a magnitude of the force.

With the force detection device 9, when the operator applies a force forward to the handle 80 with the handle 80 slightly inclining, because the handle 80 may swing on the hinge 94, the load cell 93 will receive a horizontal component and vertical component of the force, and detect the horizontal component. Although the load cell 93, which is a pressure sensor, is intended to detect only a uniaxial force, the load cell 93 indeed receives not only the uniaxial force but also a force perpendicular thereto, as described above. This has been preventing the horizontal component from being detected with high accuracy.

SUMMARY OF THE INVENTION

Accordingly, an object of the present invention is to improve detection accuracy of a force detection device.

A force detection device of the present invention is for detecting an operation force of an operator applied in a uniaxial direction, and comprises:

a force receiving part 11 for receiving the operation force;

a force detection part 5 placed on a support 6 for detecting the uniaxial force;

a force propagation body 3 disposed reciprocatably along the uniaxial direction on the support 6 for propagating the operation force received by the force receiving part 11 to the force detection part 5;

a guide provided on the support 6 for guiding reciprocation of the force propagation body 3;

a preload receiving part 2 pivoted to the force propagation body 3 and capable of swinging within a plane along the uniaxial direction; and a pair of elastic members coupled to both sides of the preload receiving part 2 with a pivot axis thereof held therebetween for giving a preload to the force detection part 5.

With the above-described force detection device of the present invention, assuming that an operator applies an operation force obliquely relative to the uniaxial direction, the obliquely applied force is divided into a component along the uniaxial direction and a component perpendicular to the uniaxial direction. The component in the uniaxial direction moves the force propagation body 3 along the guide of the support 6, while the component perpendicular to the uniaxial direction is received by the support 6. Therefore, the force detection part 5 is given only the component in the uniaxial direction, and not given the component perpendicular to the uniaxial direction.

The preload receiving part 2 turns depending on a difference between elastic repulsive forces of the pair of elastic members to thereby equalize the elastic repulsive forces of the pair of elastic members. This prevents a biased force from acting on the force propagation body 3. This allows the force propagation body 3 to reciprocate smoothly along the uniaxial direction.

Specifically, the preload receiving part 2 presses the force detection part 5 with a central portion thereof to give the preload to the force detection part 5 and to give the operation force propagated by the force propagation body 3 to the force detection part 5.

Further specifically, the pair of elastic members comprise a pair of coil springs 4, 4 extending at both sides of the force detection part 5 in the uniaxial direction, each coil spring 4 being stretched between the preload receiving part 2 and the support 6. The specific structure has the pair of coil springs 4, 4 placed in spaces at both sides of the force detection part 5 to thereby provide a compact device as a whole. This allows the force detection device to be miniaturized.

Further specifically, the force propagation body 3 comprises a plurality of rollers 30 that roll along a surface of the guide. According to the specific structure, the force propagation body 3 will move smoothly with little resistance.

As described above, the force detection device of the present invention can provide high detection accuracy.

DETAILED DESCRIPTION OF THE INVENTION

Figure 1:
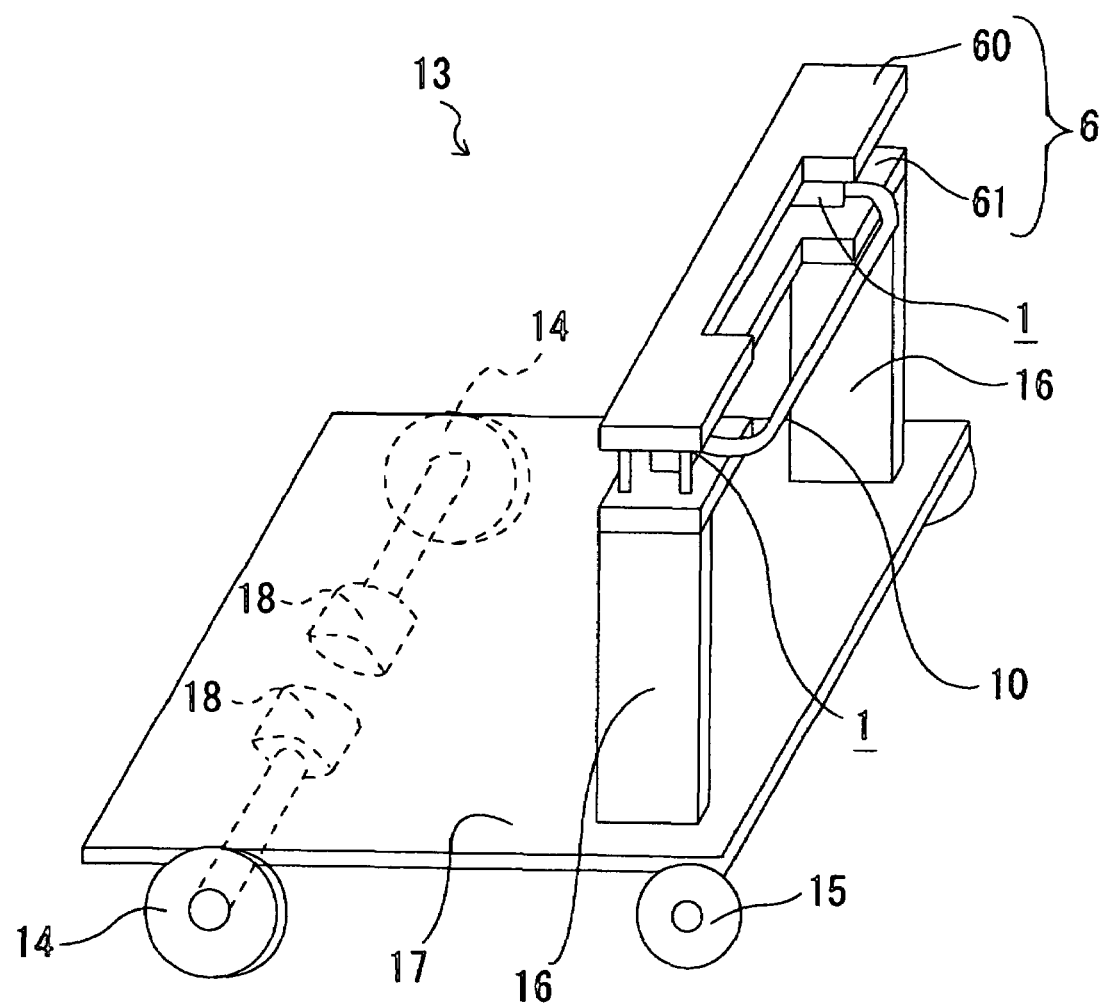
FIG. 1 is a perspective view of a power-assisted truck of the present invention.

A force detection device of the present invention embodied in a power-assisted truck will be specifically described below with reference to the drawings. As shown in FIG. 1, a power-assisted truck 13 of the present invention includes a carrier 17. On a reverse surface of the carrier 17, a pair of drive wheels 14, 14 are disposed at the front thereof in a traveling direction of the truck 13, while a pair of auxiliary wheels 15, 15 are disposed at the rear of the truck 13. Motors 18, 18 are coupled to both drive wheels 14, 14.

A pair of support members 16, 16 are erected at a rear end of the carrier 17. A support 6 is disposed on both support members 16, 16. A pair of force detection devices 1, 1 are disposed at both sides of a top plate 60 and base plate 61 constituting the support 6. A handle 10 to be gripped and given an operation force by an operator is provided bridging the two force detection devices 1, 1. When the operator applies a force to the handle 10, the two force detection devices 1, 1 detect the forward/backward operation force for the truck 13 and control torque and rotation directions to be given to both motors 18, 18 based on the detection result to thereby realize a power assist function. The base plate 61 constituting the support 6 is fixed to upper ends of the support members 16, 16.

Figure 2:
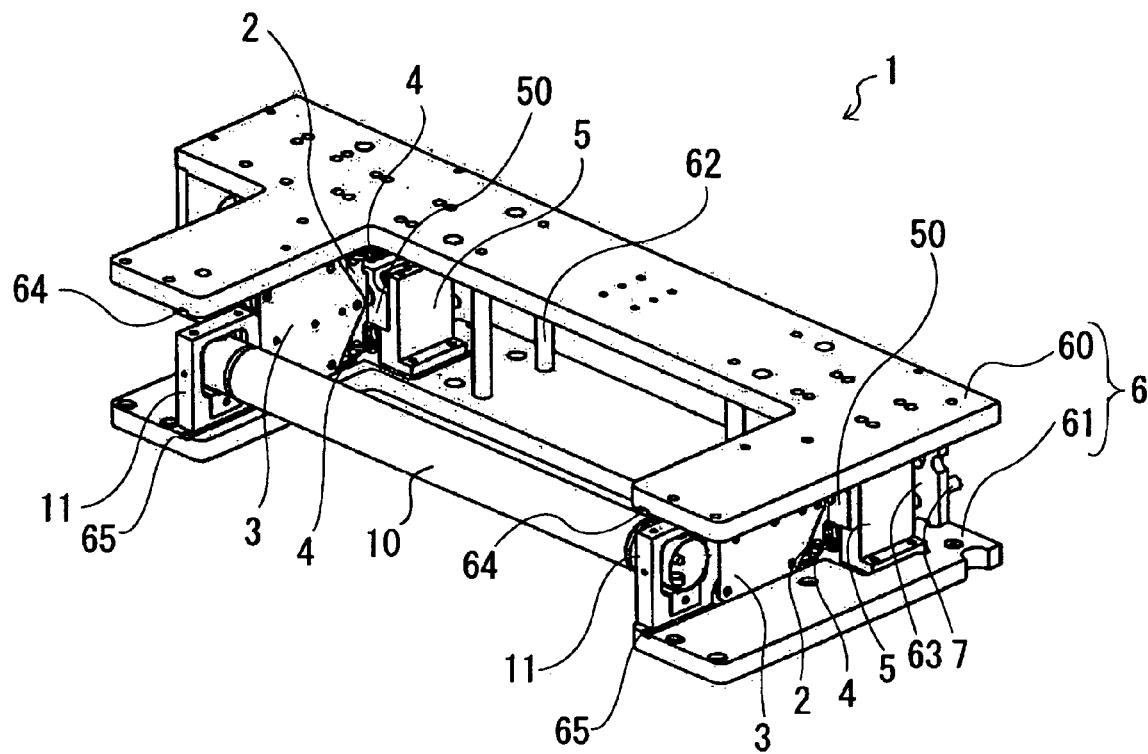
FIG. 2 is a perspective view of a force detection device of the present invention.

As shown in FIG. 2, the top plate 60 and the base plate 61 are positioned opposed to each other and coupled to each other via a plurality of posts 62. The top plate 60 of the support 6 has a reverse surface formed with a groove-like top rail 64 extending uniaxially along the forward/backward direction, while the base plate 61 of the support 6 has a front surface formed with a groove-like base rail 65 extending in the uniaxial direction, both rails 64, 65 being opposed to each other.

Figure 3:
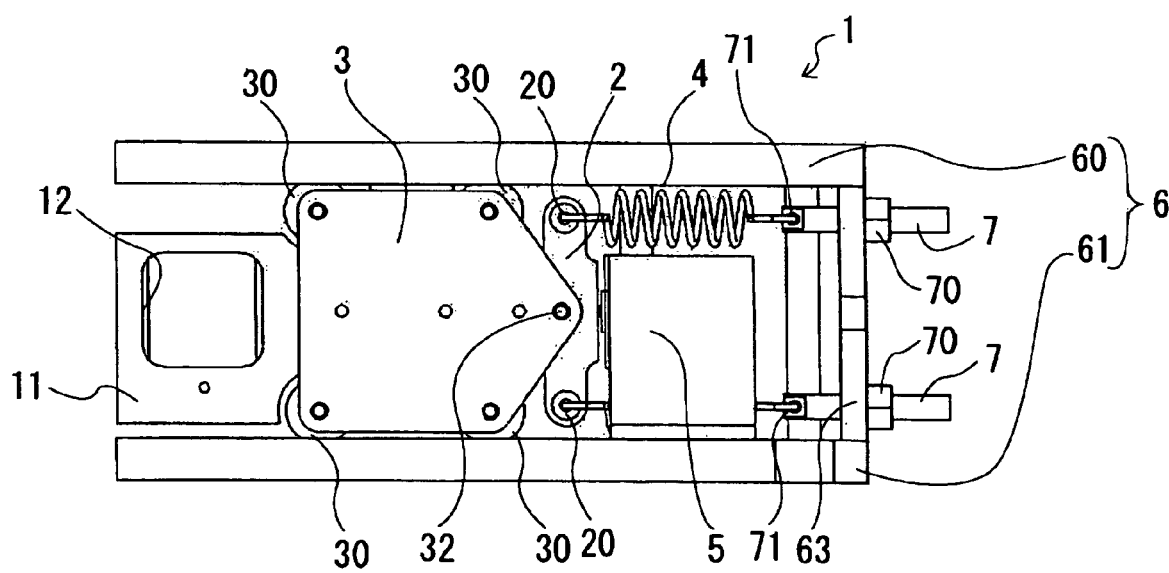
FIG. 3 is a side view of the force detection device of the present invention.

Both force detection devices 1, 1 have a symmetrical structure relative to a center line extending from the center of the handle 10 in the uniaxial direction. Therefore, one force detection device 1 will be described below. As shown in FIG. 2, a force receiving part 11 is attached to an end of the handle 10. As shown in FIG. 3, the force receiving part 11 has an opening 12. The end of the handle 10 shown in FIG. 2 is fitted into the opening 12.

As shown in FIG. 3, a force propagation body 3 is coupled to the force receiving part 11. The force propagation body 3 has an upper portion and a lower portion each provided with two rollers 30, 30. Two upper rollers 30, 30 roll along the top rail 64, while two lower rollers 30, 30 roll along the base rail 65. A vertically extending stay-like preload receiving part 2 is pivoted at a central portion thereof to an end of the force propagation body 3.

Figure 6:
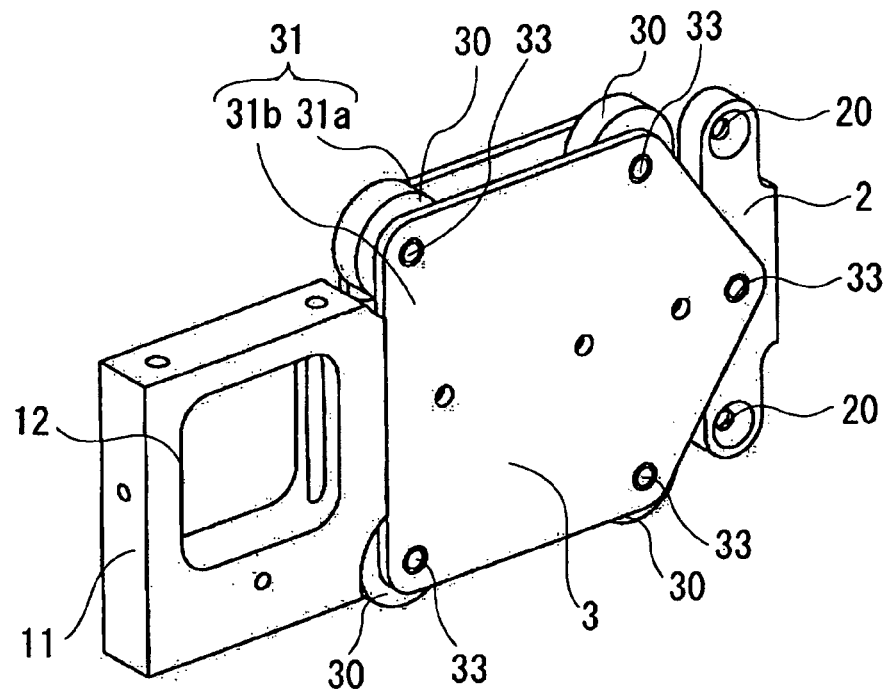
FIG. 6 is a perspective view of a force propagation body.
Figure 7:
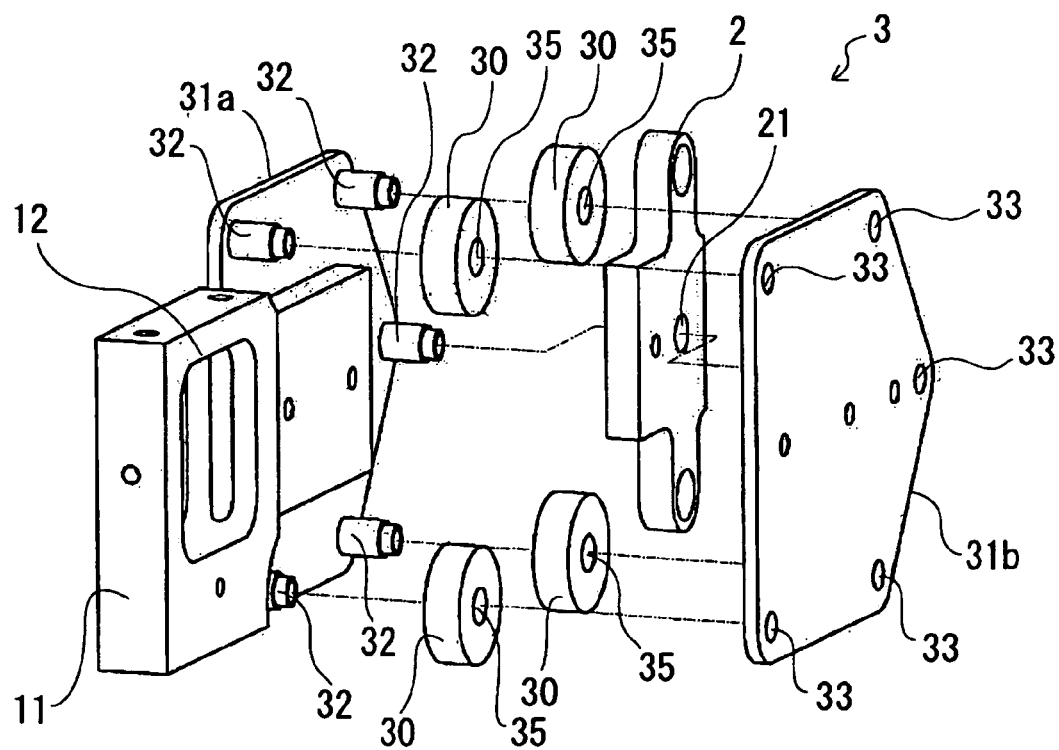
FIG. 7 is a perspective view showing the exploded force propagation body.

As shown in FIG. 6 and FIG. 7, the force propagation body 3 includes a pair of side plates 31a, 31b. Both side plates 31a, 31b are shaped such that the end thereof closest to the preload receiving part 2 projects toward the preload receiving part 2. Five shanks 32-32 are attached to one side plate 31a, while five holes 33-33 are provided in the other side plate 31b corresponding to the shanks 32-32. Four shanks 32-32 penetrate four holes 35-35 provided at the centers of the four rollers 30, and then the four shanks 32-32 of the side plate 31a are fitted into four holes 33-33 of the side plate 31b. A shank 32 penetrates a pivot hole 21 provided at the center of the preload receiving part 2, and then the shank 32 of the side plate 31a is fitted into a hole 33 of the side plate 31b to thereby couple both side plates 31a, 31b. This causes the preload receiving part 2 to be supported by the force propagation body 3 swingably within a plane along the uniaxial direction.

As shown in FIG. 3, spring hook holes 20, 20 are provided at both ends of the preload receiving part 2. A vertical plate 63 is disposed at an end of the support 6 opposite to the force receiving part 11. The vertical plate 63 is placed on the base plate 61. Spring posts 7, 7 penetrate an upper portion and a lower portion of the vertical plate 63. Preload adjustment screws 70 are screwed into both spring posts 7, 7, while spring hook holes 71 are provided at ends of both spring posts 7, 7. The preload adjustment screws 70 are turned to move the spring posts 7 in the uniaxial direction, so that coil springs 4 described below are elastically deformed to thereby allow a preload on the force detection part 5 to be adjusted.

Figure 4:
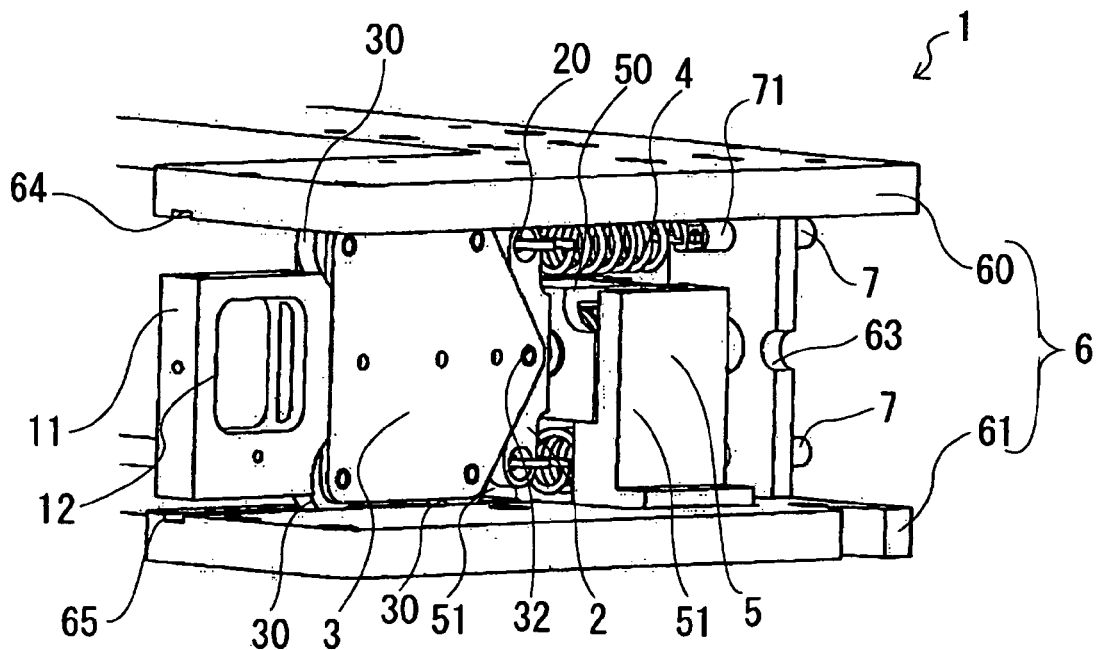
FIG. 4 is a perspective view showing a structure of the force detection device.

As shown in FIG. 4, the force detection part 5 is disposed between the preload receiving part 2 and the vertical plate 63. The force detection part 5 includes a force detection sensor 50 including a pressure sensor capable of detecting only the uniaxial pressing force, and a pair of support parts 51, 51 supporting the force detection sensor 50 above the base plate 61.

Figure 5:
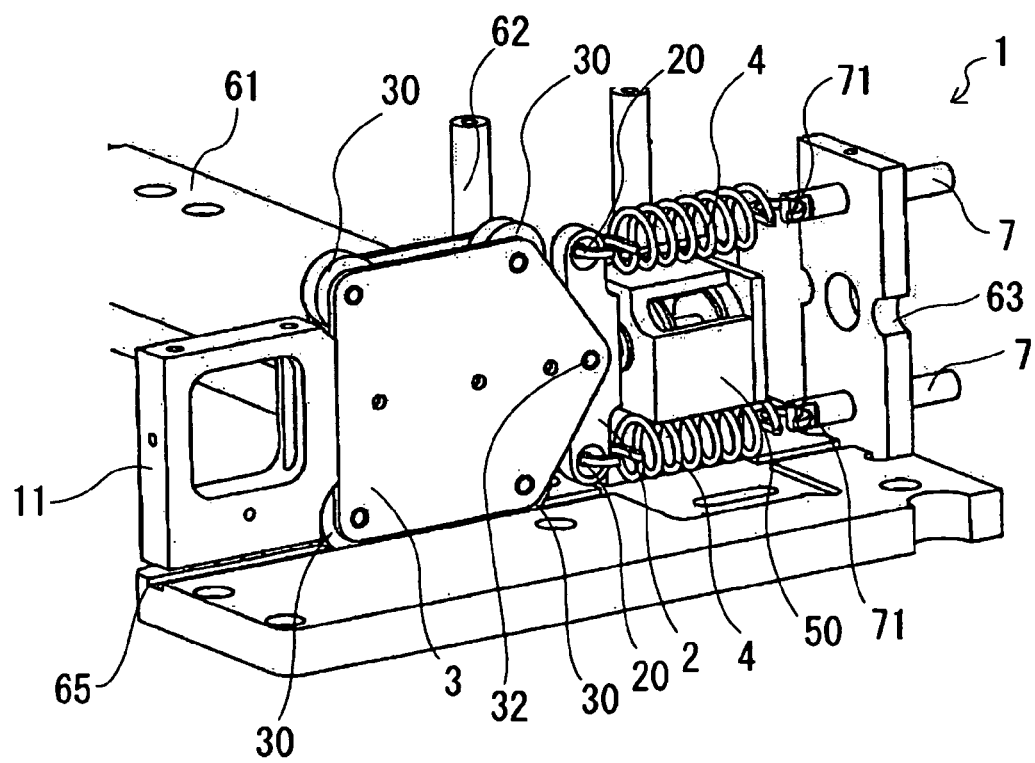
FIG. 5 is a perspective view showing a partially omitted illustration of FIG. 4.

As shown in FIG. 5, a pair of coil springs 4, 4 are disposed above and below the force detection part 5. The coil springs 4, 4 are stretched between the spring hook holes 20, 20 of the preload receiving part 2 and the spring hook holes 71, 71 of the vertical plate 63. The preload receiving part 2 presses the force detection sensor 50 with a front central portion thereof in the uniaxial direction due to elastic repulsive forces of the coil springs 4, 4 to thereby give the force detection sensor 50 the preload. Therefore, when the handle 10 shown in FIG. 2 is not given an external force, the force detection sensor 50 will detect a certain preload. When the handle 10 is given an external force, the force detection sensor 50 will detect a resultant of the preload and the external force.

According to the above-described force detection device of the present invention, when the operator applies to the handle 10 a force oblique relative to the horizontal direction, the force is divided into a horizontal component and a vertical component. Since the force propagation body 3 is movable in the uniaxial direction and restrained from moving in the direction perpendicular to the uniaxial direction, the vertical component is received by the top rail 64 or base rail 65 of the support 6. Thus, the force detection sensor 50 is given only the uniaxial force without being given the force in the direction perpendicular to the uniaxial direction, and therefore can detect the force with high accuracy.

Furthermore, the pair of coil springs 4, 4 are coupled to the preload receiving part 2 capable of swinging within a plane along the uniaxial direction. The preload receiving part 2 turns depending on a difference between the elastic repulsive forces of the pair of coil springs 4, 4 to thereby equalize the elastic repulsive forces of the pair of coil springs 4, 4. This prevents a biased force from acting on the force propagation body 3. This allows the force propagation body 3 to reciprocate smoothly along the uniaxial direction.

With the above-described force detection device 1, as shown in FIG. 4, the pair of coil springs 4, 4 are stretched at both sides of the force detection sensor 50, which provides a compact device as a whole. This allows the force detection device to be miniaturized.

Figure 8:
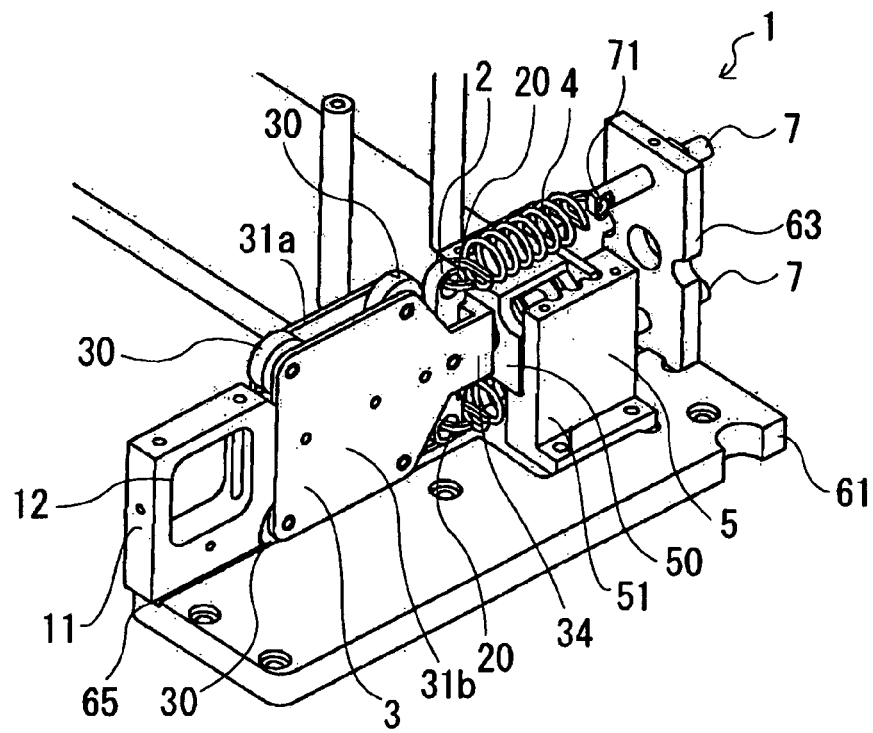
FIG. 8 is a partially omitted perspective view of a force detection device of another embodiment.
Figure 9:
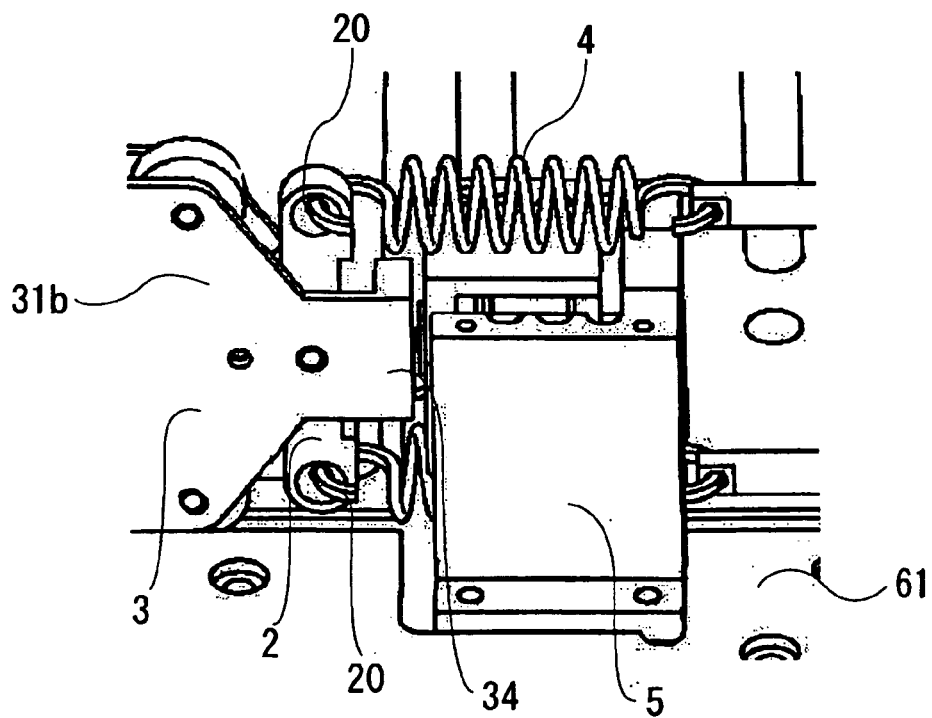
FIG. 9 is a perspective view showing a partially enlarged illustration of FIG. 8.
Figure 10:
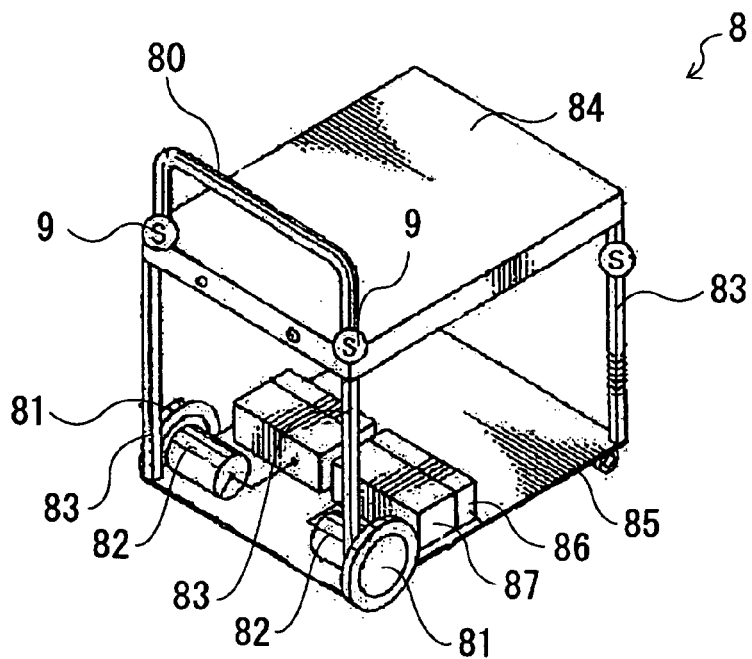
FIG. 10 is a perspective view of a conventional power-assisted truck.
Figure 11:
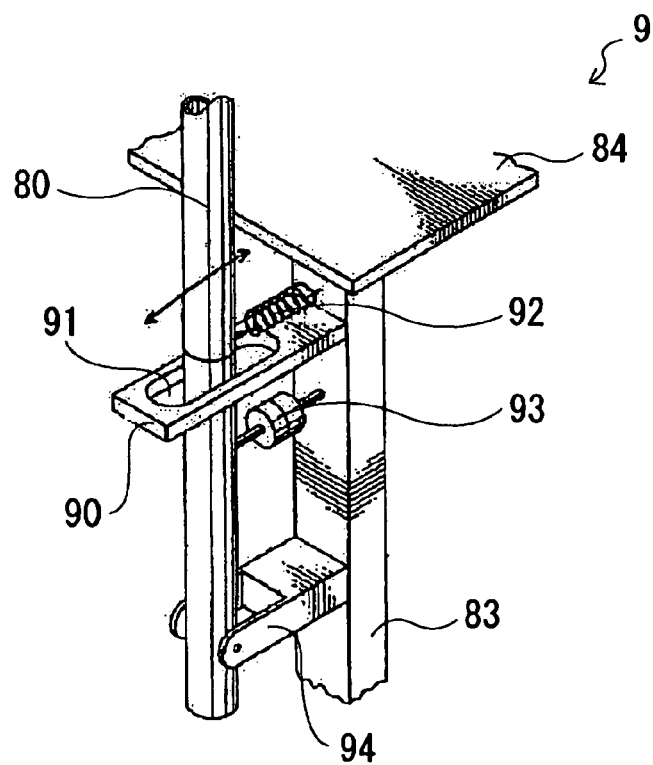
FIG. 11 is a perspective view of a conventional force detection device.

The present invention is not limited to the foregoing embodiment but can be modified variously by one skilled in the art without departing from the spirit of the invention as set forth in the appended claims. For example, while the preload receiving part 2 presses the force detection sensor 50 according to the above-described embodiment, the force propagation body 3 may press the force detection sensor 50, as shown in FIG. 8 and FIG. 9, by forming a projection 34 where an end of the force propagation body 3 projects toward the force detection sensor 50 so as to be closer than the preload receiving part 2 is to surround the preload receiving part 2. As the force detection sensor 50, super magnetostrictive sensors or pressure-sensitive rubber sensors may be used other than common load cells.

What is claimed is:

1. A force detection device for detecting an operation force of an operator applied in a uniaxial direction, the force detection device comprising:

a force receiving part for receiving the operation force;

a force detection part placed on a support for detecting the uniaxial force;

a force propagation body disposed reciprocatingly along the uniaxial direction on the support for propagating the operation force received by the force receiving part to the force detection part;

a guide provided on the support for guiding reciprocation of the force propagation body;

a preload receiving part pivoted to the force propagation body and capable of swinging within a plane along the uniaxial direction; and a pair of elastic members coupled to both sides of the preload receiving part with a pivot axis thereof held therebetween for giving a preload to the force detection part.

2. The force detection device according to claim 1, wherein the preload receiving part presses the force detection part with a central portion thereof to give the preload to the force detection part and to give the operation force propagated by the force propagation body to the force detection part.

3. The force detection device according to claim 1, wherein the pair of elastic members comprise a pair of coil springs extending at both sides of the force detection part in the uniaxial direction, each coil spring being stretched between the preload receiving part and the support.

4. The force detection device according to claim 1, wherein the force propagation body comprises a plurality of rollers that roll along a surface of the guide.

* * * * *